US009236164B2

(12) United States Patent
Lambrecht et al.

(10) Patent No.: US 9,236,164 B2
(45) Date of Patent: Jan. 12, 2016

(54) METHOD FOR PRODUCING COMPOSITE INSULATORS BY UV-CROSSLINKING SILICONE RUBBER

(71) Applicant: Wacker Chemie AG, Munich, DE (US)

(72) Inventors: Jens Lambrecht, Burgkirchen (DE); Georg Simson, Burghausen (DE); Hans-Joerg Winter, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 14/355,795

(22) PCT Filed: Nov. 28, 2012

(86) PCT No.: PCT/EP2012/073842
§ 371 (c)(1),
(2) Date: May 1, 2014

(87) PCT Pub. No.: WO2013/087414
PCT Pub. Date: Jun. 20, 2013

(65) Prior Publication Data

US 2014/0296365 A1 Oct. 2, 2014

(30) Foreign Application Priority Data

Dec. 12, 2011 (DE) ......................... 10 2011 088 248

(51) Int. Cl.

| | |
|---|---|
| ***C03C 25/10*** | (2006.01) |
| ***C08F 2/46*** | (2006.01) |
| ***C08G 61/04*** | (2006.01) |
| ***H01B 3/28*** | (2006.01) |
| ***H01B 19/00*** | (2006.01) |
| ***H01B 3/46*** | (2006.01) |
| ***H01B 3/47*** | (2006.01) |

(52) U.S. Cl.
CPC .. *H01B 3/28* (2013.01); *H01B 3/46* (2013.01); *H01B 3/47* (2013.01); *H01B 19/00* (2013.01)

(58) Field of Classification Search
CPC ............ H01B 3/28; H01B 19/00; H01B 3/47; H01B 3/46
USPC ........................................... 522/172, 1; 520/1
See application file for complete search history.

(56) References Cited

U.S. PATENT DOCUMENTS

| | | | | |
|---|---|---|---|---|
| 3,535,145 | A | 10/1970 | Gowdy et al. | |
| 3,816,282 | A | 6/1974 | Viventi | |
| 4,001,491 | A | 1/1977 | Bauer | |
| 4,064,027 | A | 12/1977 | Gant | |
| 4,246,696 | A | 1/1981 | Bauer et al. | |
| 5,925,855 | A | 7/1999 | Denndorfer | |
| 6,051,796 | A | 4/2000 | Kuhl et al. | |
| 6,251,969 | B1 | 6/2001 | Worner et al. | |
| 2002/0153163 | A1 | 10/2002 | Portas et al. | |
| 2003/0159849 | A1 * | 8/2003 | Wermelinger | 174/156 |
| 2008/0033071 | A1 * | 2/2008 | Irmer et al. | 522/66 |
| 2011/0196096 | A1 | 8/2011 | Angermaier et al. | |
| 2013/0026682 | A1 * | 1/2013 | Rist et al. | 264/478 |

FOREIGN PATENT DOCUMENTS

| | | | |
|---|---|---|---|
| CN | 2068718 | U | 1/1991 |
| CN | 102015845 | A | 4/2011 |
| DE | 2044179 | | 3/1972 |
| DE | 25 19 007 | A1 | 11/1976 |
| DE | 27 46 870 | A1 | 11/1978 |
| EP | 0821373 | A1 | 1/1998 |
| EP | 1006147 | A1 | 6/2000 |
| EP | 1091365 | A1 | 4/2001 |
| EP | 1130605 | A1 | 9/2001 |
| EP | 1147525 | A1 | 10/2001 |
| GB | 1316059 | A | 5/1973 |
| JP | 9171729 | A | 6/1997 |
| JP | 9320342 | A | 12/1997 |
| JP | 10505456 | A | 5/1998 |
| JP | 102186907 | A | 9/2011 |
| WO | 0036615 | A1 | 6/2000 |
| WO | 2009027133 | A2 | 3/2009 |
| WO | 2011-101269 | * | 8/2011 |

OTHER PUBLICATIONS

Chinese Office Action to application No. 201280056088.8, dated Aug. 17, 2015, 6 pages. (No English Translation).

Japanese Office Action to application No. 2014-545178, dated Aug. 25, 2015, 4 pages (No English Translation).

* cited by examiner

*Primary Examiner* — Ling Choi
*Assistant Examiner* — Jessica E Whiteley
(74) *Attorney, Agent, or Firm* — Brooks Kushman P.C.

(57) ABSTRACT

Composite insulators having a silicone rubber shield are economically produced by coating at least a portion of a support with a crosslinkable silicone rubber composition containing a light activated hydrosilation catalyst, and irradiating the crosslinkable silicone rubber composition to activate a crosslinking reaction.

9 Claims, 2 Drawing Sheets

METHOD FOR PRODUCING COMPOSITE INSULATORS BY UV-CROSSLINKING SILICONE RUBBER

Figure 1:
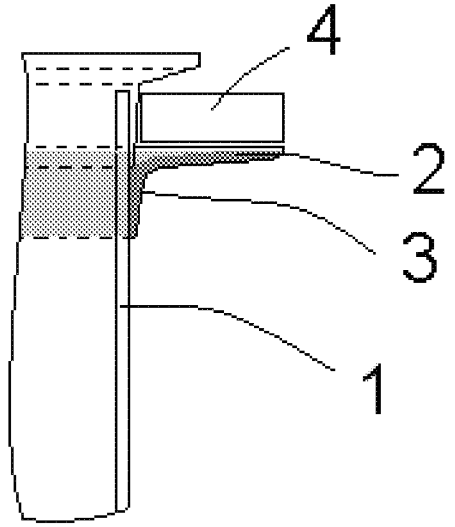

This application is the U.S. National Phase of PCT Appln. No. PCT/EP2012/073842 filed Nov. 28, 2012, which claims priority to German Application Nos. 10 2011 088 248.0, filed Dec. 12, 2011, the disclosures of which are incorporated in their entirety by reference herein.

BACKGROUND OF THE INVENTION

1. Field of the Invention

The invention relates to a process for the production of composite insulators with shielding made of UV-crosslinking silicone rubber.

2. Description of the Related Art

Silicone-elastomer-composite insulators and processes for the production of these are known. Silicone-rubber injection molding using what is known as solid rubber (HTV—high-temperature-crosslinking or HCR—high consistency rubber) features injection of silicone rubber of comparatively high viscosity into heated molds. The process is described by way of example in EP 1091365 for what are known as hollow insulators. The process is currently used for all types of components including, for example, rod insulators and surge arresters. The cycle times, which are sometimes long, have an adverse effect on the process and result from the requirement that the parts to be sheathed (e.g. fiber-reinforced epoxy-resin rods or corresponding tubes), in particular the metallic add-on parts (fittings) that sometimes protrude from the mold, must likewise be heated to the crosslinking temperature of the rubber. Large components sometimes require machines and apparatuses of considerable size.

Another disadvantage is the presence, on the molded component, of mold-parting lines which often require that the moldings be subjected to a subsequent mechanical operation.

A similar process is available using machines for lower pressures and what are known as liquid rubbers (LSR—liquid silicone rubber).

There are somewhat earlier processes, which therefore preceded the availability of large injection-molding machines, and which manufacture shields (DE 2746870) and sometimes the core sheathing (EP 1130605) individually, and then assemble these. Here again, solid rubbers are mainly used. Advantages of the processes are the flexibility of the arrangement of the shields. The large number of operations and the large number of shield-core insulation connection points and/or shield-shield connection points can have a disadvantageous effect.

Solid rubber is likewise used in processes for the production of helical shielding (EP 821373). Although that process is universally applicable, it can have the disadvantage that a connection point is likewise produced between each location and each adjacent location. The process cannot be fully automated.

The early processes, all of which can be termed casting processes (DE 2044179, DE 2519007), require the use of comparatively low-viscosity rubber. They all use what is known as room-temperature-crosslinking 2-component rubber (RTV-2), which when used can be crosslinked at slightly elevated temperature. Because each operation manufactures an individual shield, the process can be used substantially independently of the final size of the component. This technology is therefore currently useful for insulators with very large diameter. There are no longitudinal parting lines requiring a subsequent mechanical operation. A disadvantage is the long cycle time resulting from the comparatively low crosslinking rate of the rubbers used.

A feature common to all of the known processes is that the crosslinking of the electrically insulating material of the exterior sheath of the insulators either occurs spontaneously at room temperature or is initiated thermally at elevated temperature. The crosslinking at room temperature (possible by way of example in the conventional processes with open molds in accordance with DE 2044179 and DE 2519007) requires some ten minutes to some hours, and the crosslinking at elevated temperature requires a period of some minutes to some tens of minutes in the processes using molds (EP 1147525, DE 2746870, and EP 1091365) up to more than 100 minutes in the case of subsequent crosslinking in an oven, e.g. in accordance with processes described in EP 821373 and EP 1130605.

SUMMARY OF THE INVENTION

The invention provides a process for the production of composite insulators in which a supportive component is provided with shielding made of silicone rubber, characterized in that the crosslinking of the silicone rubber is initiated via UV irradiation.

DETAILED DESCRIPTION OF THE PREFERRED EMBODIMENTS

The crosslinking of the silicone rubber initiated via the UV irradiation minimizes crosslinking times, and can be used universally for any desired shapes of composite insulators, and is therefore advantageous to the user in relation to total production costs.

Handling costs are lower, plants costs are lower, and no subsequent mechanical operation is required. The process can be used not only for short manufacturing runs but also for long runs.

An example of a suitable supportive component is a plastic molding, which is preferably fiber-reinforced. The supportive component is preferably elongate, i.e. the length:diameter ratio is at least 2:1, in particular at least 3:1, and it is preferable that the supportive component is cylindrical, in particular being a rod or tube.

In particular, a fiber-reinforced plastics rod or a fiber-reinforced plastics tube is used.

The silicone rubber preferably has low viscosity. The silicone rubber is charged to a suitable open casting mold which is passed along the supportive component to be shielded and which, toward the bottom, has been suitably sealed in such a way that the silicone rubber cannot escape during the charging procedure. Once the charging procedure has been concluded or once a particular fill level has been reached, ultraviolet radiation is used to irradiate the silicone rubber with light, or for intermediate or preliminary irradiation of the silicone rubber with light. The rubber in the casting mold very rapidly becomes crosslinked during this process.

The method of use of UV radiation for the irradiation of the silicone rubber with light should advantageously be one that irradiates the silicone rubber volume to be crosslinked in a manner that gives uniformly rapid crosslinking.

It is preferable that the silicone rubber is irradiated from the open side of the casting mold. In an embodiment that is likewise preferred, the casting mold is composed of UV-permeable material or the casting mold has UV-permeable windows and the silicone rubber is irradiated through the casting mold. It is preferable here that particular locations in the subsequent shield are additionally irradiated from directions other than from above. The windows can by way of example be at the sides of the casting mold and/or underneath the casting mold.

Irradiation from one direction can sometimes be disadvantageous. In order to achieve uniform irradiation of the silicone rubber, this can be irradiated fully from a plurality of directions.

The casting mold with its charge of silicone rubber can be irradiated with light in one or more steps.

It can be necessary to use various irradiation regimes for the crosslinking of the silicone rubber, as required by the size and shape of the shields to be produced. The irradiation can take place after conclusion of the charging procedure, or after the silicone rubber has reached a particular partial fill level in the casting mold.

The material supply pathway for the silicone rubber to the casting mold can be encased or not encased.

The irradiation device that initiates crosslinking can be arranged in the material supply pathway for the silicone rubber. In this embodiment, the nature of the silicone rubber must be such that crosslinking thereof is suitably delayed and allows charging of material to the casting mold after irradiation of the rubber.

Around the material supply pathway, beneath, at the side of, or above the casting mold there can be a heating device arranged in order to accelerate the crosslinking of the irradiated silicone rubber by heating.

The UV irradiation preferably takes place at at least 0° C., more preferably at least 10° C., and most preferably at least 15° C., and preferably at no more than 50° C., more preferably no more than 35° C., and most preferably no more than 25° C.

The irradiation time is preferably at least 1 second, more preferably at least 5 seconds, and preferably no more than 500 seconds, more preferably no more than 100 seconds. The crosslinking of the silicone mixture begins as a result of the onset of a hydrosilylation reaction—the mixture gels and hardens.

The viscosity [D=0.9/25° C.] of the silicone rubber is preferably at least 100 mPas, more preferably at least 1000 mPas, preferably no more than 40 000 mPas, and more preferably no more than 20,000 mPas.

The wavelength of the UV radiation is preferably from 200 to 500 nm.

The silicone rubber can be a mixture composed of 2 components or a mixture composed of only 1 component. The silicone rubber preferably comprises:

(A) a polyorganosiloxane which comprises at least two alkenyl groups per molecule and which has a viscosity of from 0.1 to 500,000 Pa·s at 25° C., (B) an organosilicon compound comprising at least two SiH functions per molecule, and (C) a platinum-group catalyst activateable by light of from 200 to 500 nm.

The constitution of the polyorganosiloxane (A) comprising alkenyl groups preferably corresponds to the average general formula (1)

$$R^1_xR^2_ySiO_{(4-x-y)/2} \quad (1)$$

in which $R^1$ is a monovalent, optionally halogen- or cyano-substituted $C_2$-$C_{10}$-hydrocarbon moiety which comprises aliphatic carbon-carbon multiple bonds and which optionally has bonding to silicon by way of an organic bivalent group, $R^2$ is a monovalent, optionally halogen- or cyano-substituted $C_1$-$C_{10}$-hydrocarbon moiety which has bonding by way of SiC and which is free from aliphatic carbon-carbon multiple bonds, x is a non-negative number such that at least two moieties $R^1$ are present in every molecule, and y is a non-negative number such that (x+y) is in the range from 1.8 to 2.5.

The alkenyl groups $R^1$ are susceptible to an addition reaction with an SiH-functional crosslinking agent. It is usual to use alkenyl groups having from 2 to 6 carbon atoms, e.g. vinyl, allyl, methallyl, 1-propenyl, 5-hexenyl, ethynyl, butadienyl, hexadienyl, cyclopentenyl, cyclopentadienyl, cyclohexenyl, preferably vinyl and allyl.

Organic divalent groups by way of which the alkenyl groups $R^1$ can have bonding to silicon in the polymer chain are composed by way of example of oxyalkylene units such as those of the general formula (2)

$$—(O)_m[(CH_2)_nO]_o— \quad (2)$$

in which m is 0 or 1, in particular 0, n is from 1 to 4, in particular 1 or 2, and o is from 1 to 20, in particular from 1 to 5.

The oxyalkylene units of the general formula (10) have bonding to a silicon atom on the left-hand side.

The bonding of the moieties $R^1$ can be at any position in the polymer chain, in particular on the terminal silicon atoms.

Examples of unsubstituted moieties $R^2$ are alkyl radicals such as the methyl, ethyl, n-propyl, isopropyl, n-butyl, isobutyl, tert-butyl, n-pentyl, isopentyl, neopentyl, and tert-pentyl radicals, hexyl radicals, such as the n-hexyl radical, heptyl moieties such as the n-heptyl radical, octyl moieties such as the n-octyl radical, and isooctyl moieties such as the 2,2,4-trimethylpentyl radical, nonyl moieties such as the n-nonyl radical, and decyl radicals such as the n-decyl radical; alkenyl radicals such as the vinyl, allyl, n-5-hexenyl, 4-vinylcyclohexyl, and the 3-norbornenyl radicals; cycloalkyl radicals such as the cyclopentyl, cyclohexyl, 4-ethylcyclohexyl, cycloheptyl, norbornyl, and methylcyclohexyl radicals; aryl radicals such as the phenyl, biphenylyl, and naphthyl radicals; alkaryl radicals such as the o-, m-, and p-tolyl, and ethylphenyl radicals; and aralkyl radicals such as the benzyl and the alpha- and the β-phenylethyl radicals.

Examples of substituted hydrocarbon radicals as radicals $R^2$ are halogenated hydrocarbons, examples being the chloromethyl, 3-chloropropyl, 3-bromopropyl, 3,3,3-trifluoropropyl, and 5,5,5,4,4,3,3-heptafluoropentyl radicals, and also the chlorophenyl, dichlorophenyl, and trifluorotolyl radicals.

$R^2$ preferably has from 1 to 6 carbon atoms. Methyl and phenyl radicals are particularly preferred.

Constituent (A) can also be a mixture of various polyorganosiloxanes comprising alkenyl groups, where these differ by way of example in the alkenyl group content, in the nature of the alkenyl group, or structurally.

The structure of the polyorganosiloxanes (A) comprising alkenyl groups can be linear, cyclic, or branched. The content of tri- and/or tetrafunctional units leading to branched polyorganosiloxanes is typically very small, preferably at most 20 mol %, in particular at most 0.1 mol %.

Particular preference is given to the use of polydimethylsiloxanes which comprise vinyl groups and which correspond to the general formula (3)

$$(ViMe_2SiO_{1/2})_2(ViMeSiO)_p(Me_2SiO)_q \quad (3)$$

where the non-negative integers p and q comply with the following conditions: p≥0, 50<(p+q)<20 000, preferably 200<(p+q)<1000, and 0<(p+1)/(p+q)<0.2.

The viscosity of the polyorganosiloxane (A) at 25° C. is preferably from 0.5 to 100,000 Pa·s, in particular from 1 to 2000 Pa·s.

The constitution of the organosilicon compound (B) comprising at least two SiH functions per molecule is preferably that of the average general formula (4)

$$H_aR^3_bSiO_{(4-a-b)/2} \quad (4)$$

in which $R^3$ is a monovalent, optionally halogen- or cyano-substituted $C_1$-$C_{18}$-hydrocarbon moiety which has bonding by way of SiC and which is free from aliphatic carbon-carbon multiple bonds, and a and b are non-negative integers, with the proviso that $0.5<(a+b)<3.0$ and $0<a<2$ and that at least two silicon-bonded hydrogen atoms are present per molecule.

Examples of $R^3$ are the moieties stated for $R^2$. $R^3$ preferably has from 1 to 6 carbon atoms. Methyl and phenyl are particularly preferred.

It is preferable to use an organosilicon compound (B) comprising three or more SiH bonds per molecule. If an organosilicon compound (B) is used that has only two SiH bonds per molecule, it is advisable to use a polyorganosiloxane (A) which has at least three alkenyl groups per molecule.

The hydrogen content of the organosilicon compound (B), where this relates exclusively to the hydrogen atoms directly bonded to silicon atoms, is preferably in the range from 0.002 to 1.7% by weight of hydrogen, preferably from 0.1 to 1.7% by weight of hydrogen.

The organosilicon compound (B) preferably comprises at least three and at most 600 silicon atoms per molecule. It is preferable to use organosilicon compound (B) which comprises from 4 to 200 silicon atoms per molecule.

The structure of the organosilicon compound (B) can be linear, branched, cyclic, or of network type.

Particularly preferred organosilicon compounds (B) are linear polyorganosiloxanes of the general formula (5)

$$(HR^4_2SiO_{1/2})_c(R^4_3SiO_{1/2})_d(HR^4SiO_{2/2})_e(R^4_2SiO_{2/2})_f \quad (5)$$

where the definition of $R^4$ is as for $R^3$, and the non-negative integers c, d, e, and f comply with the following conditions: $(c+d)=2$, $(c+e)>2$, $5<(e+f)<200$, and $1<e/(e+f)<0.1$.

The amount of the SiH functional organosilicon compound (B) present in the crosslinkable silicone composition is preferably such that the molar ratio of SiH groups to alkenyl groups is from 0.5 to 5, in particular from 1.0 to 3.0.

The catalyst (C) used can comprise any catalysts of the platinum group, where these catalyze the hydrosilylation reactions that proceed during the crosslinking of addition-crosslinking silicone compositions and can be activated by light at from 200 to 500 nm.

The catalyst (C) comprises at least one metal or one compound from platinum, rhodium, palladium, ruthenium, and iridium, preferably platinum.

Particularly suitable catalysts (C) are cyclopentadienyl complexes of platinum, preferably of the general formula (6)

(6)

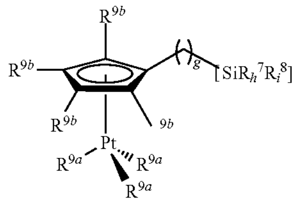

where g=from 1 to 8,

H=from 0 to 2, i=from 1 to 3, $R^7$, mutually independently, being identical or different, are a monovalent, unsubstituted or substituted, linear, cyclic, or branched hydrocarbon moiety which comprises aliphatically saturated or unsaturated or aromatically unsaturated moieties and which has from 1 to 30 carbon atoms, and in which individual carbon atoms can have been replaced by atoms of O, of N, of S, or of P, $R^8$, mutually independently, being identical or different, are hydrolyzable functional groups selected from the group comprising carboxy $—O—C(O)R^{10}$, oxime $—O—N{=}CR^{10}_2$, alkoxy $—OR^{10}$, alkenyloxy $—O—R^{12}$ amide $—NR^{10}—C(O)R^{11}$, amine $—NR^{10}R^{11}$, aminoxy $—O—NR^{10}R^{11}$, where $R^{10}$, mutually independently, being identical or different, are H, alkyl, aryl, arylalkyl, alkylaryl, $R^{11}$, mutually independently, being identical or different, are alkyl, aryl, arylalkyl, alkylaryl, $R^{12}$ is a linear or branched, aliphatically unsaturated organic moiety, $R^{9a}$, mutually independently, being identical or different, are alkyl, aryl, arylalkyl, alkylaryl having from 1 to 30 carbon atoms, where the hydrogens can have been replaced by -Hal or $—SiR_9{}^3$, where $R^9$, mutually independently, being identical or different, are a monovalent, unsubstituted or substituted, linear, cyclic, or branched hydrocarbon moiety, $R^{9b}$, mutually independently, being identical or different, are hydrogen or a monovalent, unsubstituted or substituted, linear or branched hydrocarbon moiety which comprises aliphatically saturated or unsaturated or aromatically unsaturated moieties and which has from 1 to 30 carbon atoms, and in which individual carbon atoms can have been replaced by atoms of O, of N, of S, or of P, and which can form annelated rings with the cyclopentadienyl moiety.

Preferred moieties $R^7$ are linear saturated hydrocarbon moieties having from 1 to 8 carbon atoms. Preference is further given to the phenyl moiety.

Preferred moieties $R^8$ are methoxy, ethoxy, acetoxy, and 2-methoxyethoxy groups.

Preferred moieties $R^{9a}$ are linear and branched, optionally substituted linear alkyl moieties, such as methyl, ethyl, propyl, or butyl moieties.

Preferred moieties $R^{9b}$ are linear and branched, optionally substituted linear alkyl moieties, such as methyl, ethyl, propyl, or butyl moieties. Preference is further given to optionally further substituted annelated rings, an example being the indenyl moiety or the fluorenyl moiety.

$MeCp(PtMe_3)$ is particularly preferred as catalyst (C).

Catalyst (C) can be used in any desired form, including by way of example that of microcapsules comprising hydrosilylation catalyst, or that of organopolysiloxane particles, as described in EP-A-1006147.

The content of hydrosilylation catalysts (C) is preferably selected in such a way that the content of metal of the platinum group in the silicone rubber is from 0.1 to 200 ppm, preferably from 0.5 to 40 ppm.

The silicone rubber is preferably transparent to UV radiation of from 200 to 500 nm, and in particular free from fillers that absorb UV radiation of from 200 to 500 nm.

However, the silicone rubber can also comprise filler (D). Examples of reinforcing fillers, i.e. fillers with a BET surface area of at least 50 $m^2/g$, are fumed silica, precipitated silica, carbon black, such as furnace black and acetylene black, and silicon-aluminum mixed oxides with large BET surface area. Examples of fibrous fillers are asbestos and synthetic fibers.

The fillers mentioned can have been hydrophobized, for example through treatment with organosilanes or -siloxanes, or through etherification of hydroxy groups to give alkoxy groups. Examples of non-reinforcing fillers (D) are fillers with a BET surface area of up to 50 $m^2/g$, for example quartz, diatomaceous earth, calcium silicate, zirconium silicate, zeolites, metal oxide powders, such as aluminum oxides, titanium oxides, iron oxides, or zinc oxides and mixed oxides of these, barium sulfate, calcium carbonate, gypsum, silicon nitride, silicon carbide, boron nitride, powdered glass, and powdered plastic. It is possible to use one type of filler, and it is also possible to use a mixture of at least two fillers.

If the silicone rubber comprises filler (D), the proportion thereof is preferably from 1 to 60% by weight, in particular from 5 to 50% by weight.

The silicone rubber can comprise, as constituent (E), further additives making up a proportion of up to 70% by weight, preferably from 0.0001 to 40% by weight. Said additives can by way of example be resin-like polyorganosiloxanes which differ from the diorganopolysiloxanes (A) and (B), dispersing agents, solvents, adhesion promoters, pigments, dyes, plasticizers, organic polymers, heat stabilizers, etc. Constituents having thixotropic effect are another constituent (E) that can be present, examples being fine-particle silica and other commercially available additives with thixotropic effect. Siloxanes of the formula $HSi(CH_3)_2—[O—Si(CH_3)_2]_w—H$ can also be present as chain extenders, where w has a value from 1 to 1000. Other additives (E) that can be present serve for controlled adjustment of processing time, onset temperature, and crosslinking rate of the silicone rubber.

These inhibitors and stabilizers are very well known in the field of crosslinking compositions.

It is also possible to add additives which improve the compression set. Hollow bodies can also be added. Blowing agents can also be added in order to produce foams. It is also possible to add polydiorganosiloxanes that are not vinyl-functionalized materials.

The silicone rubber is compounded via mixing, in any desired sequence, of the components listed above.

All of the technologies described can also be used, with the suitable machines and apparatuses, for components other than composite insulators, and by way of example they can also be used for the sheathing of active parts of arresters.

The definitions of all of the above symbols in the above formulae are respectively mutually independent. The silicon atom is tetravalent in all of the formulae.

Embodiments of the invention are demonstrated with reference to FIGS. 1 to 4.

The meanings of the reference numerals are listed below:

1—Supportive component
2—Silicone rubber
3—Casting mold
4—Irradiation device
5—UV-permeable casting mold or casting mold provided with UV-permeable windows FIG. 1 shows the overall schematic arrangement of the UV-irradiation device above the casting mold.

Silicone rubber charged to the casting mold is irradiated with light in such a way that rapid crosslinking of the rubber is initiated. In this arrangement, it is not necessary that the casting mold is permeable to the UV irradiation. It can be necessary to undertake the irradiation of the rubber in a plurality of layers or after a plurality of partial charging procedures, in order to achieve complete irradiation and crosslinking.

Figure 2:
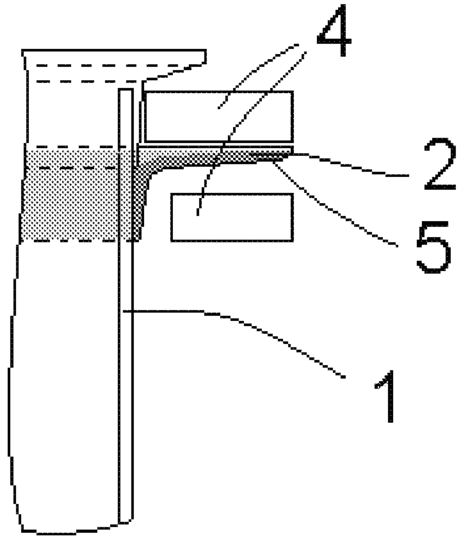

FIG. 2 shows the overall schematic arrangement with UV-irradiation devices above and below the completely or partially UV-permeable casting mold. Silicone rubber charged to the casting mold is irradiated with light in such a way that rapid crosslinking of the rubber is initiated. The casting mold is either completely permeable to the UV irradiation or comprises windows of UV-permeable material at suitable locations. The simultaneous irradiation from a plurality of directions permits achievement of substantially complete irradiation of the entire volume of the silicone rubber with light. Stepwise irradiation is possible.

Figure 3:
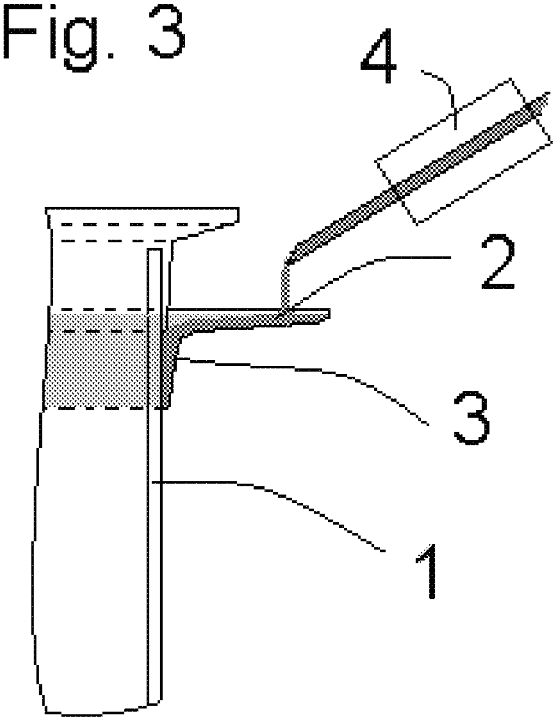

FIG. 3 shows the overall schematic arrangement with a UV irradiation device at a location along the encased material supply pathway. The irradiation of the silicone rubber with light takes place in advance of the charging procedure. In this type of modification, the nature of the silicone rubber is such that crosslinking thereof is suitably delayed and permits charging of material to the mold after irradiation of the rubber with light, but before crosslinking.

Figure 4:
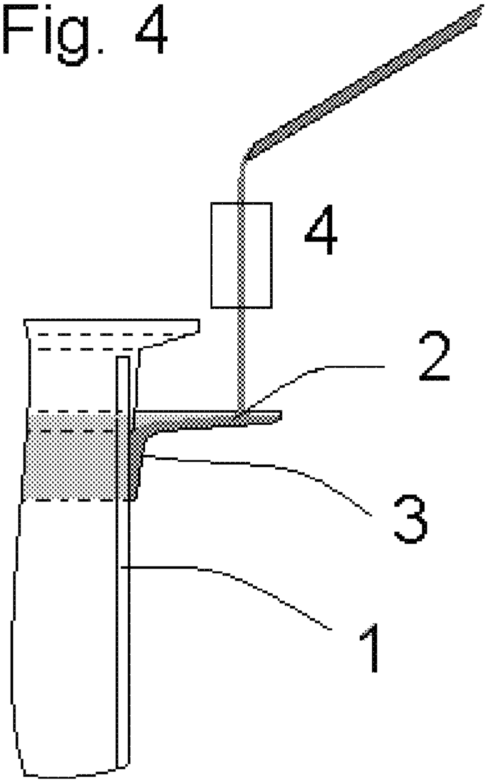

FIG. 4 shows the overall schematic arrangement with a UV irradiation device at a location along the non-encased material supply pathway. The irradiation of the silicone rubber with light likewise takes place in advance of the charging procedure. In this type of modification, the nature of the silicone rubber is such that crosslinking thereof is suitably delayed and permits charging of material to the mold after irradiation of the rubber, but before crosslinking.

What is claimed is:

1. A process for the preparation of a composite insulator in a casting mold, comprising:

providing an insulator support component in the form of a fiber-reinforced rod or tube;

introducing a crosslinkable liquid silicone rubber composition into a casting mold containing said support component, the crosslinkable liquid silicone rubber having a viscosity at 25° C. of from 1000 mPa·s to 20,000 mPa·s;

photochemically initiating crosslinking of the crosslinkable silicone rubber composition by irradiating with UV light; and removing a completed composite insulator from said mold, the composite insulator having cured silicone rubber shielding adhered thereto.

2. The process of claim 1, wherein said mold contains at least one opening for irradiating the crosslinkable liquid silicone rubber with UV light, and irradiating the crosslinkable liquid silicone rubber through the opening.

3. The process of claim 1, wherein said mold has at least one UV-transparent window for irradiating the crosslinkable liquid silicone rubber with UV light, and irradiating the crosslinkable liquid silicone rubber through the window.

4. The process of claim 1, wherein the crosslinkable liquid silicone rubber comprises:

A) a polyorganosiloxane which comprises at least two alkenyl groups per molecule and which has a viscosity of from 0.1 to 500,000 mPa·s at 25° C.;

B) an organosilicon compound comprising at least two SiH functions per molecule, and C) a platinum-group catalyst activatable by light of from 200 to 500 nm.

5. The process of claim 4, wherein at least one polyorganosiloxane bearing alkenyl groups corresponds to the average formula $$R_x^1R_y^2SiO_{(4-x-y)/2} \quad (1)$$

where $R^1$ is a monovalent, optionally halogen- or cyano-substituted $C_2$-$C_{10}$-hydrocarbon moiety which comprises aliphatic carbon-carbon multiple bonds and which optionally is bonded to silicon by way of an organic bivalent group, $R^2$ is a monovalent, optionally halogen- or cyano-substituted $C_i$-$C_{10}$-hydrocarbon moiety which is bonded to silicon by way of SiC bonding, and which is free from aliphatic carbon-carbon multiple bonds, x is a non-negative number such that at least two moieties $R^1$ are present in every molecule, and y is a non-negative number such that (x+y) is in the range from 1.8 to 2.5, wherein at least one $R^1$ is bonded to a silicon atom of (1) by an oxyalkylene unit of the formula $$-[O]_m-[(CH_2)_n-O]_o-$$

where m is 0 or 1, n is from 1-4, and o is from 1-20.

6. The process of claim 4, wherein at least one organosilicon compound B) is a linear polyorganosiloxane of the formula $$(HR^4_2SiO_{1/2})_c(R^4_3SiO_{1/2})_d(HR^4SiO_{2/2})_e(R^4_2SiO_{2/2})_f \quad (5)$$

where $R^4$ is a monovalent, optionally halogen- or cyano-substituted $C_1$-$C_{18}$-hydrocarbon moiety which is bonded to silicon by way of SiC bonding and which is free from aliphatic carbon-carbon multiple bonds, and the non-negative integers c, d, e, and f comply with the following conditions: $(c+d)=2$, $(c+e)>2$, $5<(e+f)<200$, and $1<e/(e+f)<0.1$.

7. The process of claim 1, wherein the irradiation of the silicone rubber takes place in a material supply pathway for the silicone rubber to the casting mold and the nature of the silicone rubber is such that crosslinking thereof is delayed, allowing charging of material to the casting mold after irradiation of the rubber.

8. The process of claim 1, wherein uncured silicone rubber is injected into a mold containing a supportive component, the uncured silicone rubber is cured by exposure to ultraviolet irradiation, and a completed composite insulator is removed from the mold without further process steps.

9. The process of claim 1, wherein the composite insulator contains metallic add-on parts which protrude from the mold.

* * * * *